(No Model.)

LA FAYETTE WIKIDAL.
EGG BEATER.

No. 367,569. Patented Aug. 2, 1887.

WITNESSES:
C. Neveux
C. Sedgwick

INVENTOR:
L. Wikidal
BY Munn & Co
ATTORNEYS.

UNITED STATES PATENT OFFICE.

LA FAYETTE WIKIDAL, OF SALEM, OREGON.

EGG-BEATER.

SPECIFICATION forming part of Letters Patent No. 367,569, dated August 2, 1887.

Application filed April 9, 1887. Serial No. 234,231. (No model.)

*To all whom it may concern:*

Be it known that I, LA FAYETTE WIKIDAL, of Salem, in the county of Marion and State of Oregon, have invented a new and Improved Egg-Beater, of which the following is a full, clear, and exact description.

My invention relates to beaters for whipping up eggs or for beating or mixing other ingredients while making cake or bread or other articles of food or use; and the invention has for its object to provide a simple, durable machine of this class which may be readily adjusted for operation in vessels of various sizes holding the substance to be beaten or mixed, and will do its work quickly and thoroughly with economy of time and labor of the operator.

The invention consists in certain novel features of construction and combinations of parts of the beater, all as hereinafter described and claimed.

Reference is to be had to the accompanying drawings, forming a part of this specification, in which similar letters of reference indicate corresponding parts in all the figures.

Figure 1:
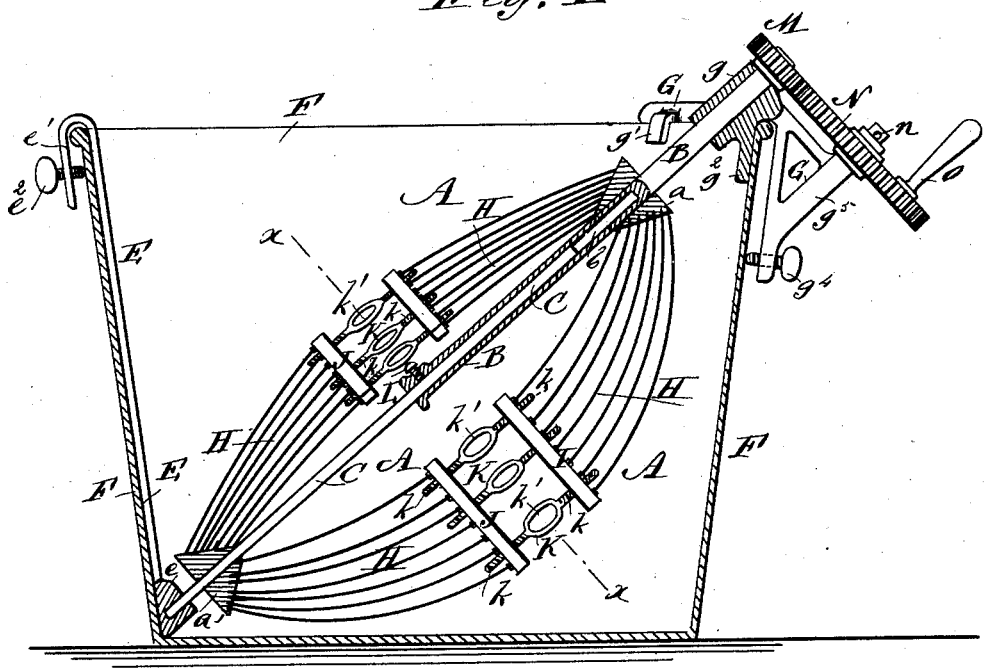
Figure 3:
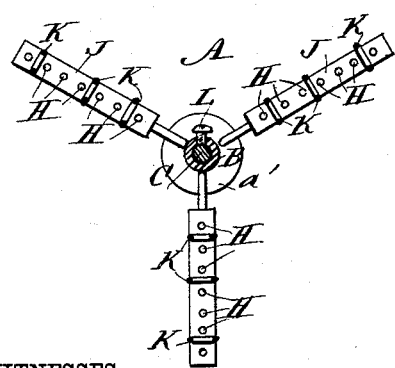
Figure 2:
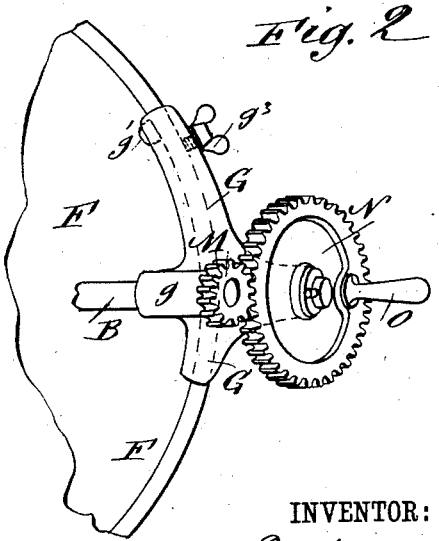

Figure 1 is a vertical sectional elevation of my improved egg-beater. Fig. 2 is a detail plan view of part of the egg-holding vessel with the driving-gearing and upper clamp of the device; and Fig. 3 is a cross-sectional elevation of the beater proper or whip, taken on the line $x\ x$, Fig. 1.

The egg-beater proper or whip, A, is supported by its opposite end or head pieces, $a\ a'$, upon a two-part or telescoping shaft, B C, which is journaled in a foot or step bearing, $e$, held by a clamp rod or bar, E, at the outer lower corner of the egg-holding vessel F, and in an upper bearing, $g$, fixed to the upper clamp-bracket, G, to which the beater-driving mechanism is held, as presently explained. The upper head-piece, $a$, of the beater A is fixed to the part B of the shaft, which is bored at $b$ to receive the lower solid part, C, of the shaft, to which the lower head-piece, $a'$, is fixed, and in the opposite head-pieces $a\ a'$ series of whip-wires H are fixed at one end, and at their other ends are fixed to radially-ranging bars or plates I J, which face each other in pairs about at the center of the beater A. The bars I J are arranged radially and preferably in three pairs, which hold the connected wires H in three radially-ranging groups around the beater-shaft. (See Figs. 1 and 3 of the drawings.) The opposite bars I J of each group of wires H are fitted to opposite screw-threaded ends, $k\ k$, of turn-buckles K, the central parts of which are formed as open loops $k'$, which co-operate effectively with the wires H in whipping up the eggs in the vessel F as the beater A is rotated in the vessel by the driving mechanism.

The lower bearing, $e$, is supported in the vessel F by a clamp-rod, E, to which $e$ is fixed, and which has a bent upper end part, $e'$, in which is fitted a thumb-screw, $e^2$, by which the rod E is bound firmly to the side of the vessel. The upper bearing, $g$, is fixed to or cast with the bracket G, which has a pendent lip, $g'$, lying against the inner face of the vessel F, and also has a heavier longer lip or flange, $g^2$, at the inner face of the vessel, below the bearing $g$, and at its outer part, nearly opposite the lip $g'$, a set-screw, $g^3$, is fitted in the bracket or pendent flange thereof, and may be set up against the outside of the vessel to hold this part of the bracket to the vessel, and another set-screw, $g^4$, is fitted in the pendent portion $g^5$ of the bracket, and may also be screwed up tightly to the outside of the vessel, to complete a firm clamping of the bracket G and its upper bearing, $g$, and hold the beater-driving shaft steadily in diagonally-ranging position in the egg-holding vessel.

A set-screw, L, threaded into the lower end of the tubular portion B of the beater-shaft, may be set in tightly against the part C of the shaft after the shaft has been adjusted lengthwise by sliding the part C in the part B, to set the lower end of the part C into the step-bearing $e$, while the upper part, B, of the shaft is held in the bearing $g$, thereby allowing the adjustment of the beater to vessels F of various sizes; and if, after adjusting the shaft lengthwise, as above described, the whip-wires H and connected bars I J and turn-buckles K should be drawn in too closely to the shaft in adjusting the beater to a larger vessel, or should the parts H I J K be carried at the center or convexed too far from the shaft in adjusting the beater to a smaller vessel, it is only necessary to turn the buckles or parts K one way or the other to either cause the whip-wires and their center couplings to bulge out more from the shaft or to carry the wires and center couplings closer to the shaft, as occasion requires, to properly adjust the beater for the most effective action on the eggs or other substance in the vessel.

To rotate the beater or whip A, I use a pinion, M, which is fixed to the part B of the driving-shaft and meshes into a gear-wheel, N, which is journaled on a gudgeon or stud, $n$, fixed to the part $g^5$ of the bracket G, and has a handle, O, which is grasped to rotate the wheel N, and thereby cause a rapid rotation of the shaft B C and the beater A thereon.

The herein-described beater is adapted not only for whipping up eggs, but it may be used to advantage in beating up batter or other substances, or for mixing ingredients of any kind used in baking cake or bread, or for other purposes, as will readily be understood.

Having thus fully described my invention, what I claim as new, and desire to secure by Letters Patent, is—

1. A beater made with a telescoping shaft, two head-pieces, one held to each part of the shaft, and wires connected to the opposite head-pieces and bulging outward from the shaft, and forming whips to beat substances in a vessel in which the beater is supported for rotation, substantially as herein set forth.

2. A beater made with a telescoping shaft, two head-pieces, one held to each part of the shaft, wires connected at one end to the opposite head-pieces and connected at their inner or opposing ends to couplings adapted to adjust the wires to give them a greater or less convexity, and also to adjust the wires relatively to the lengthwise adjustment of the telescoping shaft, substantially as herein set forth.

3. A beater made with a telescoping shaft, two head-pieces, one held to each of the two parts of the shaft, and wires connected to the opposite head-pieces and convexed from the shaft, and forming whips to beat substances placed in a vessel, in combination with an upper bearing clamped at the top of the vessel, and to which bearing the shaft-driving mechanism is connected, and a lower bearing held diagonally opposite the upper bearing at the bottom of the vessel, substantially as herein set forth.

4. The combination, in a beater, of a telescoping shaft, B C, head-pieces $a\ a'$, held thereto, wires H H, connected at one end to the head-pieces, couplings comprising bars I J and turn-buckles K, connecting the inner ends of the wires, a vessel, F, for holding the beater, a bar, E, having a screw, $e^2$, clamping it to the vessel, and provided with a step-bearing, $e$, for the beater-shaft, and a bracket, G, having a bearing, $g$, for the shaft and devices for clamping the bracket to the vessel, and gearing for rotating the beater, substantially as shown and described.

5. The combination, with a vessel, of a beater having a lower step-bearing therein and an upper bearing in a bracket, G, carrying a pinion, M, and gear-wheel N for rotating the beater, and said bracket having lips $g'\ g^2$ and set-screws $g^3\ g^4$, substantially as shown and described.

6. The beater or whip A, formed with a telescoping shaft, head-pieces $a\ a'$, held to the parts B C of the shaft, wires H H, connected at one end to the head-pieces, and couplings comprising bars I J and turn-buckles connecting the inner ends of the wires, substantially as shown and described.

7. The beater or whip A, formed with a telescoping shaft B C, head-pieces $a\ a'$, held thereto, wires H H, connected at one end to the head-pieces, and couplings comprising bars I J and turn-buckles K, having central loops or eyes, $k'$, and connecting the inner ends of the wires, substantially as shown and described.

LA FAYETTE WIKIDAL.

Witnesses:
GEO. CLAGGETT,
JOS. A. OSBORN.